(12) United States Patent
Heer

(10) Patent No.: US 11,686,639 B2
(45) Date of Patent: Jun. 27, 2023

(54) DEVICE FOR PROTECTING A SENSOR'S MEMBRANE FROM ELECTROMAGNETIC RADIATION

(71) Applicant: KISTLER HOLDING AG, Winterthur (CH)

(72) Inventor: Christian Heer, Winterthur (CH)

(73) Assignee: Kistler Holding AG, Winterthur (CH)

(*) Notice: Subject to any disclaimer, the term of this patent is extended or adjusted under 35 U.S.C. 154(b) by 197 days.

(21) Appl. No.: 16/961,076

(22) PCT Filed: Dec. 19, 2018

(86) PCT No.: PCT/EP2018/085885
§ 371 (c)(1),
(2) Date: Jul. 9, 2020

(87) PCT Pub. No.: WO2019/137772
PCT Pub. Date: Jul. 18, 2019

(65) Prior Publication Data
US 2021/0063264 A1 Mar. 4, 2021

(30) Foreign Application Priority Data
Jan. 9, 2018 (EP) ..................................... 18150814

(51) Int. Cl.
*G01L 19/06* (2006.01)
(52) U.S. Cl.
CPC .................................. *G01L 19/069* (2013.01)
(58) Field of Classification Search
CPC ............ G01L 16/0645; G01L 19/0636; G01L 19/147; G01L 19/069; G01D 11/245
See application file for complete search history.

(56) References Cited

U.S. PATENT DOCUMENTS

| | | | |
|---|---|---|---|
| 3,371,537 A | 3/1968 | Kiene | |
| 4,334,780 A * | 6/1982 | Pernick | G01B 11/303 356/512 |

(Continued)

FOREIGN PATENT DOCUMENTS

| | | |
|---|---|---|
| CN | 105801070 | 7/2016 |
| DE | 202011100428 | 7/2011 |

(Continued)

OTHER PUBLICATIONS

International Search Report and Translation, dated Mar. 20, 2019, 21 pages.

(Continued)

*Primary Examiner* — Tran M. Tran
(74) *Attorney, Agent, or Firm* — Dority & Manning, P.A.

(57) ABSTRACT

A protective device for a membrane of a sensor that detects a physical parameter acting upon the membrane includes a hollow main body that elongates in a direction along a longitudinal axis. The main body is open at one opposite end of the main body along the longitudinal axis, and at the end of the main body opposite the open end the protective device includes a bottom in which is defined a passage through which the medium is able reach the membrane when the protective device is attached to the sensor. The passage is defined in part by a wall that is configured so that the electromagnetic radiation propagating in the passage cannot reach the membrane without being reflected at least once on the wall.

14 Claims, 3 Drawing Sheets

(56) References Cited

U.S. PATENT DOCUMENTS

| | | | | |
|---|---|---|---|---|
| 4,665,806 A * | 5/1987 | Martin, Sr. | ............. | F24F 13/06 454/299 |
| 4,903,000 A * | 2/1990 | Yajima | ................ | G01L 19/0681 338/4 |
| 4,920,805 A * | 5/1990 | Yajima | .................... | G01L 19/04 73/756 |
| 5,501,724 A * | 3/1996 | Loff | .......................... | C09D 5/32 106/11 |
| 5,589,638 A * | 12/1996 | Glaser | ................ | G01L 19/0681 73/756 |
| 5,811,685 A * | 9/1998 | Grudzien, Jr. | ...... | G01L 19/0636 73/715 |
| 5,939,636 A * | 8/1999 | Glaser | .................... | G01L 23/28 73/706 |
| 6,032,538 A * | 3/2000 | Rickman | ............ | G01L 19/0636 73/756 |
| 6,122,976 A * | 9/2000 | Hallberg | ............... | G01L 19/147 73/756 |
| 6,126,819 A * | 10/2000 | Heine | .................... | B01D 65/08 210/321.89 |
| 6,443,015 B1 * | 9/2002 | Poulin | ................. | G01L 19/0636 73/715 |
| 6,883,377 B2 * | 4/2005 | Doubrovsky | ......... | G01L 19/148 361/283.4 |
| 6,901,803 B2 * | 6/2005 | Fandrey | .............. | G01L 19/0007 73/706 |
| 6,993,973 B2 * | 2/2006 | Lischer | ............... | G01L 19/0636 361/283.4 |
| 7,191,660 B2 * | 3/2007 | Lopushansky | ...... | G01L 19/0681 73/715 |
| 7,204,150 B2 * | 4/2007 | Grudzien | ............ | G01L 19/0609 73/718 |
| 7,340,959 B2 * | 3/2008 | Sato | ....................... | G01L 19/143 73/730 |
| 8,122,765 B2 * | 2/2012 | Brechbuhl | ........... | G01D 11/245 73/431 |
| 8,763,467 B2 * | 7/2014 | Ishihara | .............. | G01L 19/0636 73/708 |
| 8,919,203 B2 * | 12/2014 | Friedl | ................. | G01L 19/0636 73/715 |
| 10,620,072 B2 * | 4/2020 | Soeda | ................. | G01L 19/0681 |
| 10,670,481 B2 * | 6/2020 | Ishihara | .............. | G01L 13/025 |
| 11,268,873 B2 * | 3/2022 | Takimoto | .............. | G01L 19/069 |
| 2004/0237629 A1 * | 12/2004 | Lenzing | ................ | G01L 9/0077 73/35.12 |
| 2005/0229709 A1 | 10/2005 | Lopushansky et al. | | |
| 2009/0260434 A1 | 10/2009 | Brechbuhl et al. | | |
| 2012/0247216 A1 * | 10/2012 | Ishihara | .............. | G01L 19/0618 73/708 |
| 2014/0150559 A1 * | 6/2014 | Ishihara | .................. | G01L 19/02 73/718 |
| 2014/0182386 A1 * | 7/2014 | Ishihara | .............. | G01L 19/0627 73/754 |
| 2015/0040674 A1 * | 2/2015 | Ishihara | .............. | G01L 19/0636 73/724 |
| 2017/0250118 A1 * | 8/2017 | Yotsuya | ............ | G01L 19/0654 |
| 2018/0238756 A1 * | 8/2018 | Ishihara | ................ | G01L 9/0072 |

FOREIGN PATENT DOCUMENTS

| | | |
|---|---|---|
| EP | 2024710 A1 | 2/2009 |
| EP | 2784463 | 10/2014 |

OTHER PUBLICATIONS

International Preliminary Report on Patentability for PCT/EP2018/085885, 12 pages.

* cited by examiner

DEVICE FOR PROTECTING A SENSOR'S MEMBRANE FROM ELECTROMAGNETIC RADIATION

CROSS REFERENCE TO RELATED APPLICATIONS

This application is a continuation of copending International Application No. PCT/EP2018/085885, filed Dec. 19, 2018, which is hereby incorporated herein by this reference in its entirety for all purposes.

FIELD OF THE INVENTION

The invention relates to a protective device to be attached to a sensor and particularly to protect the sensor's membrane that detects a physical parameter transmitted through a medium acting on the membrane.

BACKGROUND OF THE INVENTION

A sensor detects a physical parameter and provides a sensor signal equivalent to the physical parameter under ideal conditions. For this purpose, a sensor element having a sensitivity for the physical parameter is arranged in a sensor. Usually, the sensor element is protected against certain external impacts such as for example dust and/or liquids and/or gases and/or electromagnetic radiation by a protective layer of the sensor such as a membrane. The term and/or is to be understood as a non-exclusive disjunction. The membrane is generally made of a metal or metal alloy or a plastic. A medium is the carrier of the physical parameter and acts upon the membrane.

A membrane is exposed to external impacts. An external impact is a temperature, a pressure, and the like.

A physical parameter is a pressure, for example. In the case of a sensor detecting a pressure, a gas or liquid is the medium that carries the pressure and through which the physical parameter of pressure acts upon the membrane. However, the sensor element of a pressure sensor exhibits temperature dependence representing an undesired effect on the sensor signal.

A thermal energy leading to a change in temperature is not only transmitted by a medium by means of heat conduction and is not only transmitted by means of heat entrainment due to convection but also by heat radiation which is an electromagnetic radiation. In the following, the term electromagnetic radiation is used exchangeably with heat radiation.

When a flame is ignited in the vicinity of the membrane, the electromagnetic radiation acting on the membrane rapidly increases. When the flame is extinguished, the electromagnetic radiation acting on the membrane rapidly decreases. If the membrane partially or completely absorbs the resulting incident electromagnetic radiation, the temperature of the membrane will increase. This increase in membrane temperature is at least partially transferred upon the sensor element and thereby affects the detected sensor signal or damages the sensor element. This effect on the sensor signal leads to detection of incorrect values for the physical parameter, however, in the following said detected physical parameter is not the temperature itself.

Rapidly occurring temperature changes of a material, for example a membrane or a sensor element, are also referred to as thermal shock and occur where a medium is burned, for example within the pressure chamber of an internal combustion engine or the like. Internal combustion engines include four-stroke and two-stroke engines such as Wankel, gasoline, diesel engines and the like. Thermal shock also occurs within other volumes in which a pressure prevails such as within a gas turbine, within a jet engine, within a rocket engine, within a steam turbine, and within a steam engine or the like constructions. In the following, the pressure chamber of an internal combustion engine and the volumes mentioned above in which a pressure prevails are collectively referred to as pressure chamber. In contrast to an almost constant ambient temperature that exhibits a slow variation over time, the impact of a thermal shock on the sensor signal of a sensor placed within a pressure chamber cannot be eliminated altogether or only insufficiently can it be minimized in the context of a calibration.

Furthermore, if the temperature exceeds a material-dependent threshold value for the material of the membrane, then the membrane will be damaged by the thermal shock. Moreover, repeated thermal shocks cause ageing of the membrane resulting in age-related damage to the membrane.

A membrane protection is known from EP2024710A1 (WO/2007/140641) which is attached to a front area of a sensor that is provided with a membrane in its front area, which membrane protection is able to withstand temperatures of up to 500° C. In one embodiment, the membrane protection comprises a plurality of openings (passages) through which a medium carrying the information to be measured can flow. The diameter of the passages is selected to prevent the penetration of flames so that the membrane protection is a flame protection. Applicant's US Patent Application Publication No. 2009-0260434 is hereby incorporated herein by this reference for all purposes.

This flame protection design has the disadvantage that electromagnetic radiation generated by at least one source of radiation on the side of the medium may directly act upon the membrane through the passages and accordingly may lead to thermal shock. This thermal shock affects the sensor signal in a way that causes incorrect values for the physical parameter to be detected by the sensor. Depending on the intensity of the electromagnetic radiation, the electromagnetic radiation may damage the membrane and/or the sensor element.

OBJECTS AND SUMMARY OF THE INVENTION

It is an object of the present invention to provide a protective device for a membrane of a sensor in such a configuration that electromagnetic radiation propagating within the passage is reflected at least once from a wall of the passage before it reaches the membrane whereby the intensity of the electromagnetic radiation impinging upon the membrane is reduced. It is another object of the invention to provide the protective device in such a configuration that a medium being the carrier of the physical parameter to be detected is able to act upon the membrane as unhindered as possible.

At least one of these objects has been achieved by the embodiments of the invention described herein.

The present invention relates to a protective device for a membrane of a sensor; which sensor detects a physical parameter, said physical parameter being transmitted by a medium, which medium acts upon the membrane; which protective device can be attached to the sensor; which protective device has a longitudinal axis; which protective device when attached to the sensor protects the membrane from electromagnetic radiation of at least one source of radiation; said protective device comprising at least one passage, through which passage the medium is able to reach the membrane when the protective device is attached to the sensor; and in which passage the electromagnetic radiation can propagate when the protective device is attached to the sensor; wherein an electromagnetic radiation propagating within the passage is first reflected at least once from a wall of the passage, or shortly passage wall, before it reaches the membrane.

In this way, the intensity of the electromagnetic radiation impinging on the membrane is reduced compared to a protective device having passages in which the electromagnetic radiation can propagate from the source of radiation to the membrane without being reflected on the wall of the passage.

The propagation of electromagnetic radiation from a source of radiation occurs in radial and linear directions in space.

When electromagnetic radiation, or shortly radiation, impinges on the protective device, then at least one reflection on a wall of the passage, or shortly passage wall, is necessary according to the invention for the radiation to reach the membrane from the source of radiation. If the radiation impinges on the passage wall said radiation will be partially absorbed, partially reflected and partially scattered whereafter it will again propagate in radial and linear directions from the passage wall.

A reflection of the radiation is understood to mean a directed reflection of the radiation from a surface whereas scattering of the radiation is understood to mean a diffuse reflection of the radiation from a surface. Absorption is understood to mean the conversion of the radiation in thermal energy at the surface so that thermal energy is supplied to the surface.

Thus, after the radiation has impinged on the passage wall the intensity of the radiation propagating within the passage decreases. This is due to absorption of part of the radiation by the passage wall. This is also due to partial reflection and scattering of the radiation in a direction in which the radiation is emitted from the passage on a side of the protective device that faces away from the membrane, shortly referred to as the medium side, so that it is not able to reach the membrane. This is known as backscattering or back reflection, respectively.

Only a small proportion of the radiation is able to impinge upon the membrane after only one impingement on the passage wall. The much greater part of the radiation impinges several times on the passage wall and its intensity decreases with each impingement due to the absorption mentioned above. Backscatter and back reflection additionally reduce the intensity of the radiation that reaches the membrane. Therefore, the radiation that reaches the membrane is many times less compared to the radiation that reaches the membrane through a prior art protective device.

Moreover, the medium must be able to pass as unhindered as possible through the protective device in order to minimize the effect of the geometry of the protective device on the information to be detected. If the flow resistance of the passages is high, a change in pressure will act upon the membrane in a delayed fashion due to the flow resistance of the medium flowing through the passages. The flow resistance is dependent on the clear width of the passages and the length of the path of the medium through the passage. A clear width of a passage is the area of the passage projected on a plane. Thus, there exists a cutoff frequency for pressure changes so that pressure changes occurring faster than the reciprocal value of this cutoff frequency can only be detected with insufficient accuracy in terms of the pressure profile over time.

Furthermore, the passages have a resonance frequency since the combination of the protective device and the sensor represents a Helmholtz resonator which has at least one resonance frequency. The detection of pressure changes occurring on time scales in the range of the inverse resonance frequency is inaccurate. The resonance frequency is dependent on the volume between the protective device and the membrane and on the clear width of the passages. A clear width of a passage is the area of the passage projected on a plane.

The protective device attached to the sensor comprises a surface that faces the membrane of the sensor which is referred to as the membrane side. The side of the protective device that faces away from the membrane is referred to as the medium side. The passages extend from the medium side to the membrane side.

The configuration of the protective device is such that the ratio of the sum of the clear widths of the passages on the membrane side or the medium side to the surface of the membrane is at least 0.25. This increases the resonance frequency and the cutoff frequency and rapid pressure changes such as those occurring in an internal combustion engine are detected eliminating any effect of the resonance frequency.

BRIEF DESCRIPTION OF THE DRAWINGS

In the following the invention will be explained in more detail by way of example referring to the figures in which.

DETAILED DESCRIPTION OF EXEMPLARY EMBODIMENTS

Figure 1:
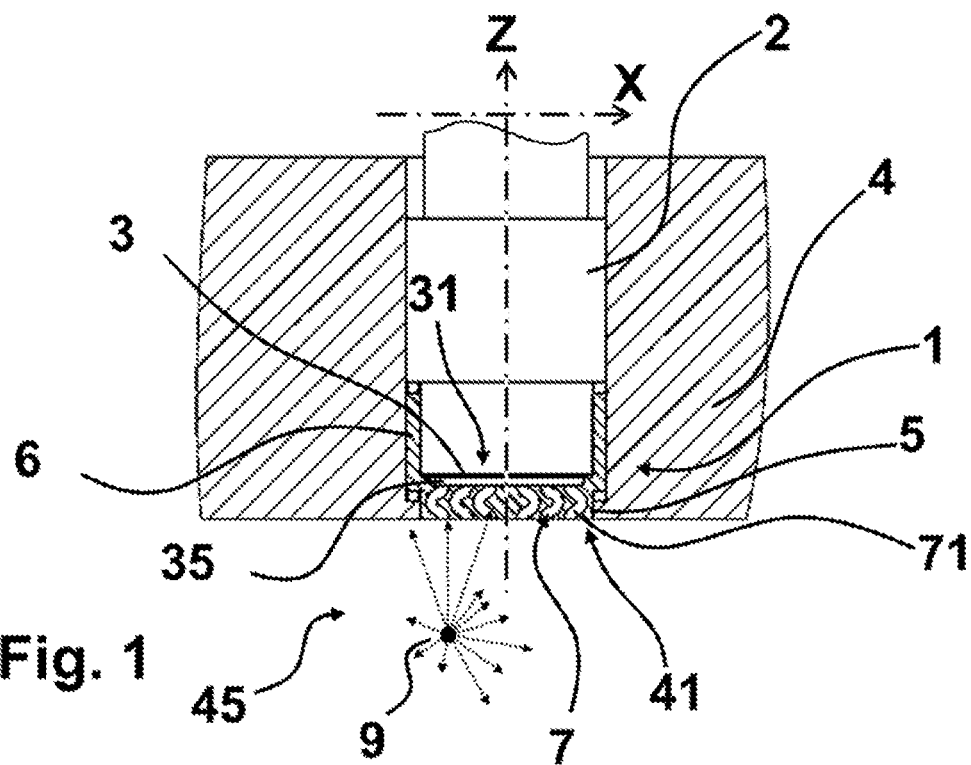
FIG. 1 is a sectional view through the Z X plane of a protective device in a preferred embodiment comprising a sensor in an installation part wherein the sensor is not represented with section hatching for purposes of clarity.

FIG. 1 shows a sectional view of the protective device 1 in a preferred embodiment that comprises a sensor 2 in an installation part 4 such as a section of a wall of a pressure chamber. Sensor 2 is not represented with section hatching for purposes of clarity.

Figure 2:
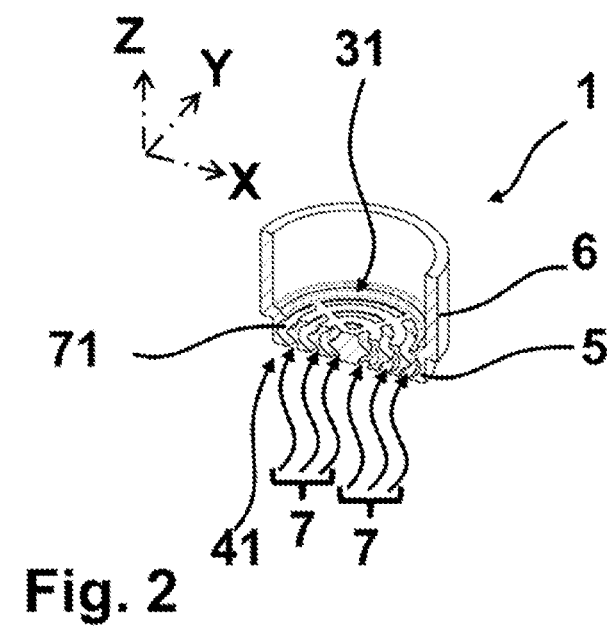
FIG. 2 is a perspective view in partial cross section parallel to the longitudinal Z axis through the embodiment of the protective device according to FIG. 1.

The sensor 2 is substantially rod-shaped along the longitudinal axis Z, from which the two radially extending axes X and Y originate as schematically shown in FIG. 2. Sensor 2 is shown incorporated in an installation part 4 in FIG. 1. Advantageously, sensor 2 is introduced in the installation part 4. Installation part 4 delimits a chamber volume 45 in which the physical parameter is to be detected. The medium being the carrier of the physical parameter is in the chamber volume 45. Sensor 2 comprises the membrane 3 which extends parallel to a first radial axis X and parallel to a second radial axis Y at that end of the sensor 2 that faces the chamber volume 45. The longitudinal axis Z, first radial axis X and second radial axis Y form an orthogonal system as schematically shown in FIG. 2. The first and second radial axes form a radial plane XY. The medium acts upon membrane 3.

In one embodiment, the chamber volume 45 is the chamber volume of a pressure chamber of an internal combustion engine.

Figure 3:
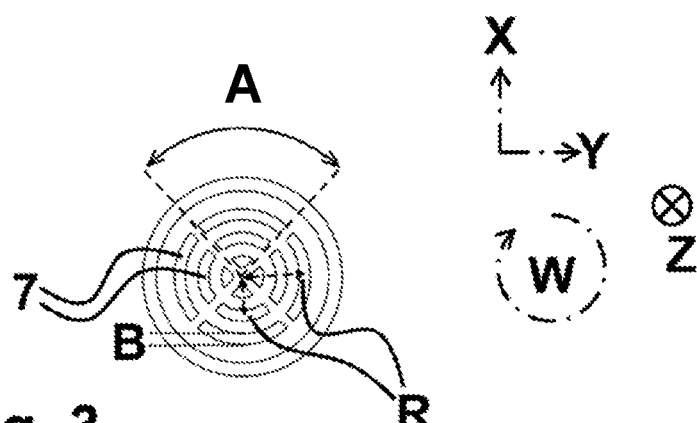
FIG. 3 is a view in the Z direction from the bottom of the protective device according to FIG. 1.

Alternatively, the radial plane XY spanned by the first and second radial axes X, Y is described by means of a radius R and a polar angle W below. The radius R, polar angle W and longitudinal axis Z form a cylindrical coordinate system as schematically shown in FIG. 3.

In a preferred embodiment, the protective device 1 is pot-shaped comprising a disc-shaped pot bottom 5 and a main body that is defined by a hollow-cylindrical pot wall 6 that elongates along a longitudinal-axis Z. The pot wall 6 and pot bottom 5 are integrally formed or are connected to one another by material bonding.

The protective device 1 can be attached to the sensor 2. If it is attached to the sensor 2, then the protective device 1 protects the membrane 3 from electromagnetic radiation of at least one source of radiation 9 schematically shown in FIGS. 1 and 4, said source of radiation 9 being arranged within the chamber volume 45.

The protective device 1 attached to the sensor 2 is arranged in such a manner schematically shown in FIG. 1 that the inner surfaces of the hollow cylindrical pot wall 6 face the outer surface of the sensor 2 and the membrane 3 faces the membrane side 31 of pot bottom 5. The other side of the disc-shaped pot bottom 5 is called the medium side 41. The membrane 3 and pot bottom 5 are oriented substantially parallel and spaced apart from one another along the longitudinal axis Z. Accordingly, the protective device 1 is arranged between the membrane 3 and chamber volume 45 and the longitudinal axis Z of the sensor 2 coincides with the longitudinal axis Z of the hollow cylindrical pot wall 6.

In one embodiment, the protective device 1 is integrally connected to the sensor 2, for example by means of a welded connection.

In another embodiment, the protective device 1 is connected to the sensor 2 by a force-locking connection, for example by a screw connection or clamp members.

In a further embodiment, the protective device 1 is connected to the sensor 2 by a form-locking connection, for example by means of a bayonet catch.

The membrane 3, pot bottom 5 and pot wall 6 surround a volume on the membrane side, shortly referred to as membrane volume, 35.

In the pot bottom 5 is formed at least one passage 7, which is configured so that when the protective device 1 is attached to the sensor 2 the medium passes through said passage 7 from the chamber volume 45 on the medium side 41 to the membrane volume 35 on the membrane side 31. When the protective device 1 is attached to the sensor 2, then the electromagnetic radiation is able to propagate in the passage 7.

Figure 4:
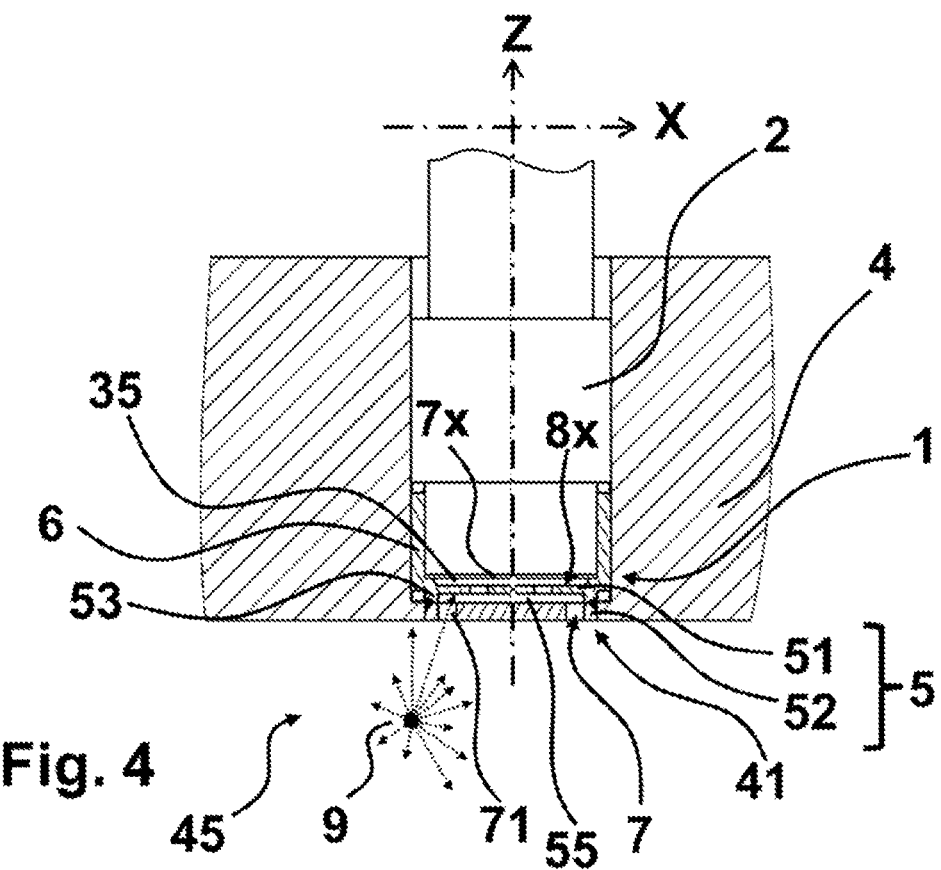
FIG. 4 is a sectional view through the Z X plane of a protective device in another embodiment comprising a sensor in an installation part where the sensor is not represented with section hatching for purposes of clarity.

According to the invention, as schematically shown in FIGS. 1 and 4, the passage 7 in the pot bottom 5 of the protective device 1 is configured so that electromagnetic radiation propagating in passage 7 from a source of radiation 9 within the chamber volume 45 is first reflected at least once from a passage wall 71 before it reaches the membrane 3. As shown in FIGS. 1 and 2 for example, each passage wall 71 includes at least two sections contiguous with each other in the longitudinal direction Z that combine to define a zig-zag path through the single plate that defines the bottom 5 of the protective device 1.

There is no linear connecting straight path along the direction of the longitudinal axis Z through passage 7 between a position on the membrane side 31 and a position on the medium side 41.

FIG. 2 is a representation of a preferred first embodiment of the protective device 1 in which a sectional plane extends along the longitudinal axis Z and along the radius R, which is depicted parallel to the X axis in FIG. 2, and with the polar angle W (shown schematically in FIG. 3) being constant. As shown in FIG. 2, the pot bottom 5 defines at least one passage 7 having a predefined width B indicated in FIG. 3. As shown in FIG. 2, there are a plurality of passages 7, and each passage 7 extends in the sectional Z-X plane in a shape similar to the letter v tilted by 90°. The course of the v-shaped passage is represented by a trajectory in the sectional plane indicating the center of the passageway in the radial plane XY, which trajectory indicates a radius R as a function of the position on the longitudinal axis Z, wherein with progression in the longitudinal direction Z the radius of the trajectory increases by more than the width B up to a point approximately in the middle between the membrane side 31 of the pot bottom 5 and the medium side 41 of the pot bottom 5. From this point on which is approximately in the middle between the membrane side 31 of the pot bottom 5 and the medium side 41 of the pot bottom 5, desirably the radius R of the trajectory again decreases by more than the width B. Due to this shape of the trajectory there is no linear connection between the membrane side 31 and the medium side 41 through a passage 7. Electromagnetic radiation originating from the source of radiation 9 and propagating in a linear fashion to some extent also into the passage 7 is first reflected at least once from a passage wall 71 before it reaches the membrane 3 as schematically shown in FIG. 1.

For each plane perpendicular to the longitudinal axis Z, passage 7 describes at least one circular arc on a constant radius R along the polar angle W where a center angle A of the circular arc is less than 355° as shown in FIG. 3. As schematically shown in FIG. 3, the center angle A is the angle between two straight lines extending from the center of the circle of which the circular arc is a part to the ends of the circular arc. If a plurality of passages 7 is situated on the same radius R, then the sum of the center angles A of their arcs will be less than 355°. The structure of the pot bottom 5 occupying the remaining angle of at least 5° not occupied by an arc of the passage 7 serves for stabilizing the pot bottom 5 and prevents the pot bottom 5 from being split into a plurality of separate parts by the arcs of the passages 7.

Advantageously, a plurality of passages 7 are arranged in the pot bottom 5 such that they begin on the medium side 41 on different radii R and are v-shaped along the longitudinal axis Z and end on different radii R on the membrane side 31 without the passage walls 71 of different passages 7 interfering with each other. In this way, the sum of the clear widths of the passages 7 at least on the membrane side 41 of the pot bottom 5 or the medium side 41 of the pot bottom 5 is such that the ratio of the sum of the clear widths of the passages 7 to the surface of the membrane 3 is at least 0.25. A clear width of a passage 7 is the area of the passage 7 projected on a plane, for example the plane of a surface of pot bottom 5 on the medium side 41 or the membrane side 31.

In a preferred embodiment, the protective device 1 is advantageously made of a metal or metal alloy. In a particularly advantageous embodiment, the protective device 1 is made of a metal or metal alloy resistant to temperatures of higher than 500° C.

In a further embodiment, the protective device 1 is made of a ceramic material, for example silicon nitride.

In a preferred embodiment, the protective device 1 is advantageously produced by means of selective laser sintering or selective laser melting, which methods are based on local melting of a pulverized material, for example an alloy or metal or ceramic material. Layer-by-layer deposition and selective melting of the pulverized material enable the manufacture of the passages 7 in the complex shapes described above.

However, those skilled in the art may also use a different production method, such as laser metal deposition or direct metal deposition consisting of the targeted deposition of a metal powder at a specific position by means of a nozzle wherein the powder is melted by a laser while being transported to this position.

In a particularly preferred embodiment, the passage wall 71 of at least one passage 7 has a high arithmetic mean roughness value according to DIN EN ISO 4287:2010, shortly called roughness, which is at least 5 micrometers. Thereby, incident electromagnetic radiation is not only reflected but also scattered. Advantageously, the directly reflected part of the reflected electromagnetic radiation, i.e. the reflection, is less than 80%. This minimizes the proportion of the electromagnetic radiation that is reflected at the passage wall 71 and, thus, is able to propagate from the medium side 41 to the membrane side 31 and reduces the impact of the electromagnetic radiation on the membrane 3.

FIG. 4 shows another preferred embodiment of the protective device 1 in a sectional view taken in the X-Z plane. The sensor 2 is not represented with section hatching for purposes of clarity.

Figure 5:
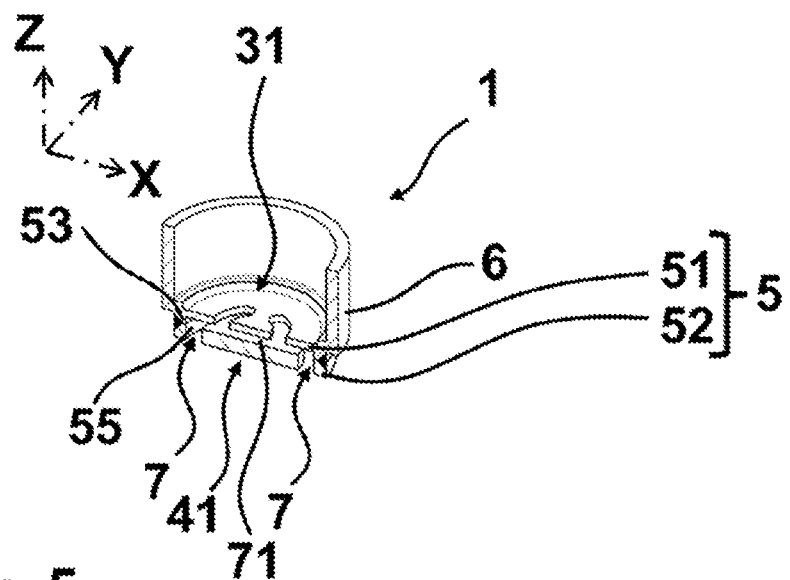
FIG. 5 is a perspective view in partial cross section parallel to the longitudinal Z axis through the embodiment of the protective device according to FIG. 4.

The protective device 1 is pot-shaped comprising a disc-shaped pot bottom 5 and a hollow cylindrical pot wall 6. The disc-shaped pot bottom 5 comprises at least two disc-shaped pot bottom parts 51, 52 arranged parallel one on top of the other and connected by material bonding. At least one pot bottom part 51 comprises a rib-shaped protrusion 53 in the direction of the longitudinal axis Z formed completely around the outer circumference of the surface on the side facing the other pot bottom part 31 on the outer circumference of the surface of pot bottom part 51. This rib-shaped protrusion 53 abuts on the other pot bottom part 52. Pot bottom parts 51, 52 are connected by material bonding along the rib-shaped protrusion 53, which material connection is indicated in FIGS. 4 and 5 by a pair of solid black triangles. The rib-shaped protrusion 53 on the outer circumference of pot bottom 5 defines a volume formed between the pot bottom parts 51, 52 that is referred to as the intermediate volume 55.

The pot wall 6 and one pot bottom part 51 are integrally formed or connected by material bonding. The sensor 2 is arranged within the protective device 1 such that the inner surfaces of the pot wall 6 face the outer surface of the sensor 2 and the membrane 3 faces the membrane side 31 of the pot bottom 5.

Pot bottom parts 51, 52 comprise passages 7 arranged on the pot bottom parts 51, 52 such that the passages 7 together with the intermediate volume 55 are substantially S-shaped in at least one sectional view of a section parallel to longitudinal axis Z. The position of the passages 7 of pot bottom parts 51, 52 and the dimension of the protrusion 53 are chosen in such a way that electromagnetic radiation propagating within the passage 7 from a source of radiation 9 arranged in the chamber volume 45 must first be reflected at least once from a passage wall 71 before it reaches the membrane 3, as shown in FIG. 5.

Figure 6:
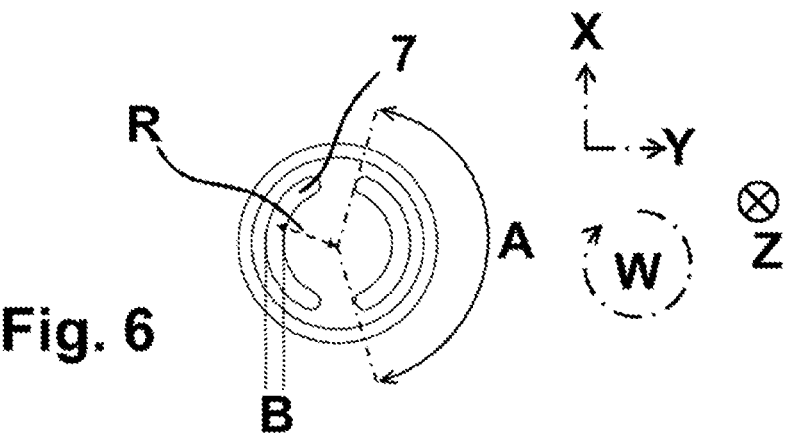
FIG. 6 is a view in the Z direction from the bottom of the protective device according to FIG. 4.

The sum of the clear widths of the passages 7 on at least the membrane side 31 of the pot bottom 5 or the medium side 41 of the pot bottom 5 is such that the ratio of the sum of the clear widths of the passages 7 to the surface of the membrane 3 is at least 0.25, as shown in FIG. 6.

In one embodiment, the protective device 1 is fabricated using machining production methods. The passages 7 may be produced by milling or drilling from different angles in a plurality of operational steps, for example.

In one embodiment of the protective device 1, at least one passage wall 71 comprises a coating, which coating absorbs electromagnetic radiation. The coating absorbs at least 10% of the incident electromagnetic radiation intensity, and thus reducing the reflected intensity by at least 10% as compared to an uncoated passage wall 71.

In a further embodiment of the protective device 1, the passage wall 71 comprises a coating, which coating is a non-stick coating. This non-stick coating results in 50% less adsorption of particles present in the medium on the passage wall 71 as compared to an uncoated passage wall 71.

However, those skilled in the art may of course choose a different arrangement of the passages 7. The passages 7 may be conceived as extending along straight lines instead of circular arcs in the plane parallel to the longitudinal axis Z. Furthermore, a passage 7 having a circular clear width is also conceivable.

However, those skilled in the art may of course design the passage 7 to extend in a sectional plane parallel to the longitudinal axis Z along a trajectory that is not substantially S-shaped or V-shaped but having such a shape that electromagnetic radiation propagating in the passage 7 from the source of radiation 15 must be reflected at least once on a passage wall 71 before it reaches the membrane 3.

In a preferred embodiment, the sensor is a pressure sensor wherein a piezoelectric measuring element is arranged in said pressure sensor. Under the impact of a pressure acting on the membrane the membrane exerts a force upon the piezoelectric measuring element which generates an electrical charge corresponding to the exerted force. The electrical charge is converted and provided as a sensor signal using well-known electronic components.

LIST OF REFERENCE NUMERALS 1 protective device
2 sensor
3 membrane
4 installation part
5 pot bottom
6 pot wall
7 passage
8 source of radiation
31 membrane side
35 volume on the membrane side, membrane volume
41 medium side
45 chamber volume
51 pot bottom part
52 pot bottom part
53 protrusion
55 intermediate volume
71 passage wall, wall of the passage
A center angle
R radius
W polar angle X first radial axis
Y second radial axis
Z longitudinal axis

The invention claimed is:

1. A protective device for a membrane of a sensor that detects a physical parameter acting on the membrane via a fluid medium, the protective device comprising:
   a hollow main body that elongates along a longitudinal direction and defines an open end at one end of the main body, wherein the open end is configured to connect to the sensor and configured to surround the membrane when the hollow main body is connected to the sensor;
   a single plate disposed at an end of the main body that is disposed along the longitudinal direction opposite the open end of the main body, the single plate extending in a direction perpendicular to the longitudinal direction and having a membrane side disposed to face the membrane when the hollow main body is connected to the sensor, the single plate defining a medium side disposed opposite the membrane side of the single plate;
   wherein the single plate defines a plurality of passages;
   wherein each of the plurality of passages is defined by a respective wall that extends contiguously from the medium side of the single plate and completely through the single plate through the membrane side of the single plate and thereby to function as a separate path for the fluid medium to reach the membrane when the protective device is attached to the sensor;
   wherein the respective wall of a first one of the plurality of passages is defined by a surface that extends continuously through the single plate from the membrane side of the single plate to the medium side of the single plate;
   wherein the surface of the respective wall of the first one of the plurality of passages has a first section that extends along a first direction that diverges away from a longitudinal axis that is aligned with the longitudinal direction; and
   wherein the surface of the respective wall of the first one of the plurality of passages has a second section that extends contiguously in the longitudinal direction with the first section while extending along a second direction that diverges away from the first direction to define a zig-zag path through the single plate.

2. The protective device according to claim 1, wherein the passage is substantially V-shaped in at least one sectional view of a section parallel to the longitudinal axis.

3. The protective device according to claim 1, wherein the passage is substantially S-shaped in at least one sectional view of a section parallel to the longitudinal axis.

4. The protective device according to claim 1, wherein when the protective device is attached to the sensor, the ratio of the clear width of the outlet of the passage on the membrane side to the surface of the membrane is at least 0.25.

5. The protective device according to claim 1, wherein the wall within the passage has an average roughness value of at least 5 micrometers; and wherein a directed incident electromagnetic radiation is reflected on the rough surface in such a way that the directed proportion of the reflected radiation is less than 80%.

6. The protective device according to claim 1, wherein the wall includes a coating that absorbs electromagnetic radiation.

7. The protective device according to claim 6, wherein the coating is a non-stick coating.

8. The protective device as in claim 7, wherein the coating is configured so that as few as 50% fewer particles present in the medium adsorb on the wall as compared to an uncoated wall.

9. The protective device as in claim 6, wherein the coating is configured to absorb at least 10% of the incident intensity of the electromagnetic radiation leading to a reduction in reflected intensity by at least 10% as compared to an uncoated passage wall.

10. The protective device according to claim 1, wherein the protective device is made of a metal or metal alloy.

11. The protective device according to claim 1, wherein the protective device is made of a ceramic material.

12. The protective device as in claim 1, wherein the passage is configured and disposed relative to the wall so that a straight line beginning on the medium side cannot pass through both the passage and the open end of the passage on the membrane side.

13. The protective device as in claim 1, wherein the passage terminates at the membrane side of the single plate in an outlet having a clear width, which is an area of the outlet of the passage projected on a plane lying parallel to a planar orientation that is assumed by the membrane in the absence of the fluid medium acting on the membrane, wherein the clear width is configured having a circular peripheral border.

14. The protective device as in claim 1, wherein each of the plurality of passages is defined by its own wall having a surface that extends continuously through the single plate from the membrane side of the single plate to the medium side of the single plate;
   wherein the surface of each respective wall of each of the plurality of passages has its own first section that extends along a first direction that diverges away from a longitudinal axis that is aligned with the longitudinal direction; and
   wherein the surface of each respective wall of each of the plurality of passages has its own second section that extends along a second direction that diverges away from the first direction.

* * * * *